(12) United States Patent
Narayanan (10) Patent No.: US 7,086,088 B2
(45) Date of Patent: Aug. 1, 2006

(54) PREVENTING STACK BUFFER OVERFLOW ATTACKS

(75) Inventor: Ram Gopal Lakshmi Narayanan, Woburn, MA (US)

(73) Assignee: Nokia, Inc., Irving, TX (US)

( * ) Notice: Subject to any disclaimer, the term of this patent is extended or adjusted under 35 U.S.C. 154(b) by 962 days.

(21) Appl. No.: 10/144,792

(22) Filed: May 15, 2002

(65) Prior Publication Data

US 2003/0217277 A1 Nov. 20, 2003

(51) Int. Cl.
*G06F 12/16* (2006.01)
*G06F 11/30* (2006.01)

(52) U.S. Cl. ............... 726/22; 713/187; 713/190
(58) Field of Classification Search ............... 726/22; 713/187, 189–190; 717/114, 117–118, 153; 703/15; 708/100, 135, 231, 235–236, 250

See application file for complete search history.

(56) References Cited

U.S. PATENT DOCUMENTS 5,881,279 A * 3/1999 Lin et al. ............... 712/244
6,044,220 A * 3/2000 Breternitz, Jr. ......... 717/139

OTHER PUBLICATIONS

Immunix: Adaptive System Survivability, printed from http://www.cse.ogi.edu/DISC/projects/immunix, 2 pages, Mar. 26, 2002.

The IA-32 Intel® Architecture Software Developer's Manual, vol. 3: System Programming Guide, printed from http://www.developer.intel.com/design/pentium4/manuals/245472.htm, 1 page, Apr. 17, 2002.

Immunix.org: The Source for Secure Linux Components and Platforms, printed from http://immunix.org/stackguard.html, 2 pages, Mar. 26, 2002.

StackGuard Mechanism: Stack Integrity Checking, printed from http://immunix.org/StackGuard/mechanism.html, 1 page, Mar. 26, 2002.

Aleph One, "BoS: Smashing The Stack For Fun And Profit", printed from http://immunix.org/StackGuard/profit.html, 38 pages, Mar. 26, 2002.

Cowan, Crispin et al., "StackGuard: Automatic Adaptive Detection and Prevention of Buffer-Overflow Attacks", printed from http://www.cse.ogi.edu/DISC/projects/immunix, 15 pages.

Cowan Crispin et al., "Protecting Systems from Stack Smashing Attacks with StackGuard", printed from http://www.cse.ogi.edu/DISC/projects/immunix, 11 pages.

(Continued)

*Primary Examiner*—Hosuk Song
(74) *Attorney, Agent, or Firm*—Banner & Witcoff, Ltd.

(57) ABSTRACT

A method and system for preventing stack buffer overflow attacks in a computer system are disclosed. A computer system can prevent stack buffer overflow attacks by encrypting return addresses prior to pushing them onto the runtime stack. When an encrypted return address is popped off the runtime stack, the computer system decrypts the encrypted return address to determine the actual return address. A random encryption key can be used, which can be generated from the CPU's clock cycle counter. Multitasking environments can add a seed register to the task state so that each task can use a unique seed to encrypt the return addresses.

30 Claims, 4 Drawing Sheets

OTHER PUBLICATIONS

Cowan Crispin et al., "Buffer Overflows: Attacks and Defenses for the Vulnerability of the Decade", printed from http://www.cse.ogi.edu/DISC/projects/immunix, 11 pages, 1999.

Hinton Heather et al., "SAM: Security Adaptation Manager", 10 pages.

Immunix.org: The Source for Secure Linux Components and Platforms, FormatGuard, printed from http://immunix.org/formatguard.html, 3 pages, Mar. 26, 2002.

Cowan Crispin et al., "FormatGuard: Automatic Protection From printf Format String Vulnerabilities", WireX Communications, Inc., USENIX Security Symposium, Aug. 2001.

* cited by examiner

| I/O Map Base Address | | | < | RESERVED | > | T | 104 |
|---|---|---|---|---|---|---|---|
| < | RESERVED | > | \multicolumn{3}{c|}{LDT Segment Selector} | | | 100 |
| < | RESERVED | > | \multicolumn{3}{c|}{GS} | | | 96 |
| < | RESERVED | > | \multicolumn{3}{c|}{FS} | | | 92 |
| < | RESERVED | > | \multicolumn{3}{c|}{DS} | | | 88 |
| < | RESERVED | > | \multicolumn{3}{c|}{SS} | | | 84 |
| < | RESERVED | > | \multicolumn{3}{c|}{CS} | | | 80 |
| < | RESERVED | > | \multicolumn{3}{c|}{ES} | | | 76 |
| \multicolumn{7}{c|}{EDI} | | 72 |
| \multicolumn{7}{c|}{ESI} | | 68 |
| \multicolumn{7}{c|}{EBP} | | 64 |
| \multicolumn{7}{c|}{ESP} | | 60 |
| \multicolumn{7}{c|}{EBX} | | 56 |
| \multicolumn{7}{c|}{EDX} | | 52 |
| \multicolumn{7}{c|}{ECX} | | 48 |
| \multicolumn{7}{c|}{EAX} | | 44 |
| \multicolumn{7}{c|}{EFLAGS} | | 40 |
| \multicolumn{7}{c|}{EIP} | | 36 |
| \multicolumn{7}{c|}{CR3 (PDBR)} | | 32 |
| < | RESERVED | > | \multicolumn{3}{c|}{SS2} | | | 28 |
| \multicolumn{7}{c|}{ESP2} | | 24 |
| < | RESERVED | > | \multicolumn{3}{c|}{SS1} | | | 20 |
| \multicolumn{7}{c|}{ESP1} | | 16 |
| < | RESERVED | > | \multicolumn{3}{c|}{SS0} | | | 12 |
| \multicolumn{7}{c|}{ESP0} | | 8 |
| < | \multicolumn{5}{c|}{Seed Register} | > | 4 |
| < | RESERVED | > | \multicolumn{3}{c|}{Previous Task Link} | | | 0 |

PREVENTING STACK BUFFER OVERFLOW ATTACKS

FIELD OF THE INVENTION

The invention relates generally to computer security. More specifically, the invention relates to the prevention of buffer-overflow-type security attacks.

BACKGROUND OF THE INVENTION

The need for computer security steadily increases as computer systems become more complex, networks become more distributed, and Internet users proliferate around the world. As vulnerabilities in computer systems are detected, those who detect the vulnerability (e.g., hackers) often create malicious scripts that exploit the newly found vulnerability and make these scripts publicly available on the Internet, e.g., on an anonymous FTP site. Less savvy computer users, sometimes referred to as "script kiddies," can then freely download the malicious script and attack other computer systems using the script's prepackaged capabilities.

A known vulnerability in most computer systems is a vulnerability to buffer overflow attacks. Buffer overflow attacks, generally, exploit a lack of error checking when programs write data to temporary buffer arrays allocated in the stack. Malicious programs attempt to write data to buffer arrays in order to either place the malicious code in the victim program's address space or to manipulate pointers to point to malicious code already there. During a buffer overflow attack, an attacker arranges for suitably malicious code to be present in a victim program's address space, and gets the program to jump to the malicious code with suitable parameters loaded into the program's registers and memory. When the malicious code is executed, software executing on the computer or filed stored on the computer can become corrupted, deleted, or used as the basis for launching another attack, and ultimately the system is compromised.

An attacker can either inject malicious code through string input, or exploit already present code in an unintended manner. Because many programs do not verify that data written to a buffer is smaller than the buffer's actual size, a hacker can manipulate a program to write data beyond the end of the buffer's allocated memory (i.e., overflow the buffer), which may then execute on or alter the system in which it is written. Programs written in C and C++ are particularly vulnerable to buffer overflow attacks because the C and C++ programming languages typically perform no array bounds checking. As a result, a hacker can inject malicious executable binary code specific to the machine being attacked by writing data past the end of a buffer array. The hacker can also make arbitrary changes to program state data stored adjacent to the array, such as changing a pointer to a return address, in order to alter the program's control flow to point to the malicious code.

Figure 1:
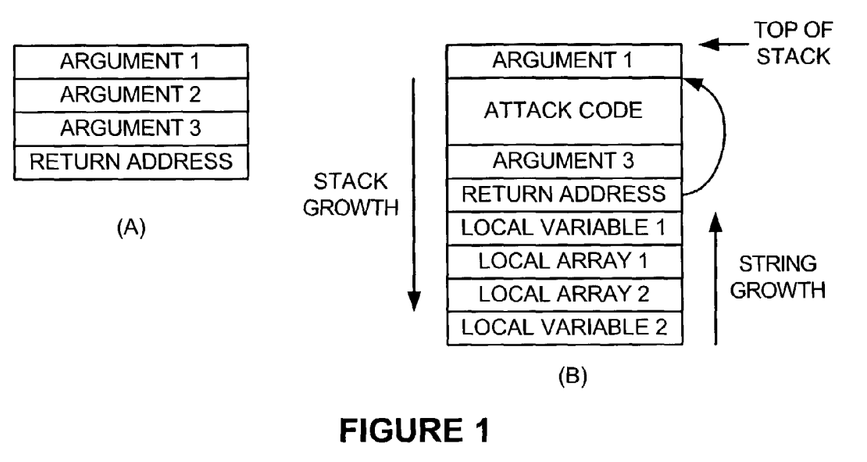
FIG. 1 illustrates a conventional runtime stack and a stack buffer overflow attack.

With reference to FIG. 1, the most common data structure attacked using the buffer overflow technique is the runtime stack. These attacks are known in the art and are often referred to as stack buffer overflow or stack smashing attacks. When a program calls a function, the program typically pushes the function's arguments onto the stack (from right to left if the program is written in "C or C++"), and then pushes the return address onto the stack. For example, in FIG. 1, stack (A) results from the function call foo (argument3, argument2, argument1). The function might also declare automatic local arrays and variables, as necessary, after the function is executed but before the variables are used, as shown in FIG. 1, stack (B).

Suppose the function foo accepts a string packet from a remote machine and copies the string onto the stack frame. If foo only accepts fixed length strings, buffer overflow might not be a problem. However, if foo accepts a variable length string with length n and copies it into a fixed length array whose size is less than n, then the stack frame becomes corrupted. An attacker can overflow an automatic variable (e.g., local variable 1) local to the function to overwrite the return address, such as is shown in FIG. 1, stack (B), to point to attack code. When the victim function returns and dereferences the return address, the attacked program will jump to the attack code, and execute whatever malicious code the attacker injected into the stack.

As stated above, the attacker may inject the attack code, or exploit already present code in an unintended manner. If the attacker injects the attack code, he or she may do so by overflowing an input variable, or by simply including it within an input variable when the expected size of the input variable is large enough to accommodate the malicious code. Alternatively, the attacker can alter a return address to point to already present code. For example, if the attack code wants to execute a root shell, the attacker may alter the return address to point to preexisting code that executes a root shell, such as exec ("/bin/sh"), as is known in the art.

Known stack buffer overflow attacks include attacks on activation records, function pointers, and longjmp buffers. The common requirement for each attack is the need to alter a program's control flow. As stated above, an attacker typically alters the control flow by overflowing a buffer to overwrite a return address of a function call. Various known solutions have attempted to prevent malicious code from overwriting return addresses, with limited success.

One known solution is to make the runtime stack non-executable. That is, data stored in the stack portion of a user program's address space is prevented from executing. As a result, injected attack code also cannot be executed. While the approach offers a minimal performance penalty, the necessary patches are non-trivial to implement, and require considerable financial and personnel development resources. In addition, this solution unnecessarily prevents all data in the stack from executing, even data that is known to be safe.

Another known solution is to perform integrity checks on the stack when a program is compiled. For example, Stack-Guard (commercially available from WireX Communications, Inc. of Portland, Oreg.) provides a compiler extension that checks stack integrity when a program is compiled, and plugs any potential buffer overflow vulnerabilities. Stack-Guard inserts instructions to detect when a return address has been altered before returning from a function (and subsequently executing an attacker's code). However, in order to benefit from a compiler enhancement such as StackGuard, a program must be recompiled using the enhanced compiler. Thus, every vulnerable program on a system would need to be recompiled in order to completely protect that system against buffer overflow attacks. Due to the vast amount of legacy programs already present on computer systems, and the large number of programs still being developed without proper array bounds checking, this solution would require vast amounts of time and resources to effectively implement.

Still other known solutions use a canary mechanism on each function call. That is, the system injects a random number between the function call's last argument and the return address. The system assumes that the return address is unaltered if and only if the canary (random) number is unaltered. However, canary mechanisms often do not work properly when used with a debugger, requiring developers to expend additional development resources (personnel time, processor time, etc.).

Thus, it would be an advancement in the art to provide a solution that protects computer systems from buffer overflow attacks without requiring that each vulnerable program on the computer system be recompiled. It would be a further advancement in the art to provide a solution that does not disrupt debuggers used in software development cycles.

BRIEF SUMMARY OF THE INVENTION

Aspects of the invention overcome the problems of the prior art by providing system-wide transparent protection against buffer overflow attacks, without requiring changes to preexisting software or to current software development practices. Each time a function is called, the return address may be encrypted before being placed on the execution (runtime) stack. Each time a function returns, the return address may be decrypted before control flow returns to that address.

A first aspect of the invention provides a method for preventing stack buffer overflow attacks in a computer system. Prior to executing an operation code (eopcode), the computer system scans the opcode to determine whether the opcode is any of a trigger set of opcodes. When a trigger opcode is found, the computer system encrypts a return address associated with the trigger opcode. When the computer system later executes the trigger opcode, the computer system pushes the encrypted return address onto the runtime stack instead of pushing the unencrypted return address onto the runtime stack. Similarly, when the computer system encounters a return address on the runtime stack, the computer system decrypts the value from the stack to determine the actual return address.

Another aspect of the invention provides a computer system protected against stack buffer overflow attacks. The computer system includes an encryption module that encrypts a return address prior to the return address being pushed onto the runtime stack, and a decryption module that decrypts the encrypted return address when it is read from the runtime stack. A CPU controls the computer system's operation based on an operating system stored in memory, and pushes the encrypted return address, instead of the unencrypted return address, onto the runtime stack. When the CPU reads the encrypted return address from the runtime stack, the CPU alters the executing program's control flow based on the decrypted return address.

In some embodiments, the computer system can be a mobile telephone, personal digital assistant, or other data processing device.

BRIEF DESCRIPTION OF THE DRAWINGS

The present invention is described with respect to the accompanying figures, in which like reference numerals identify like elements, and in which.

DETAILED DESCRIPTION OF THE INVENTION

Figure 2:
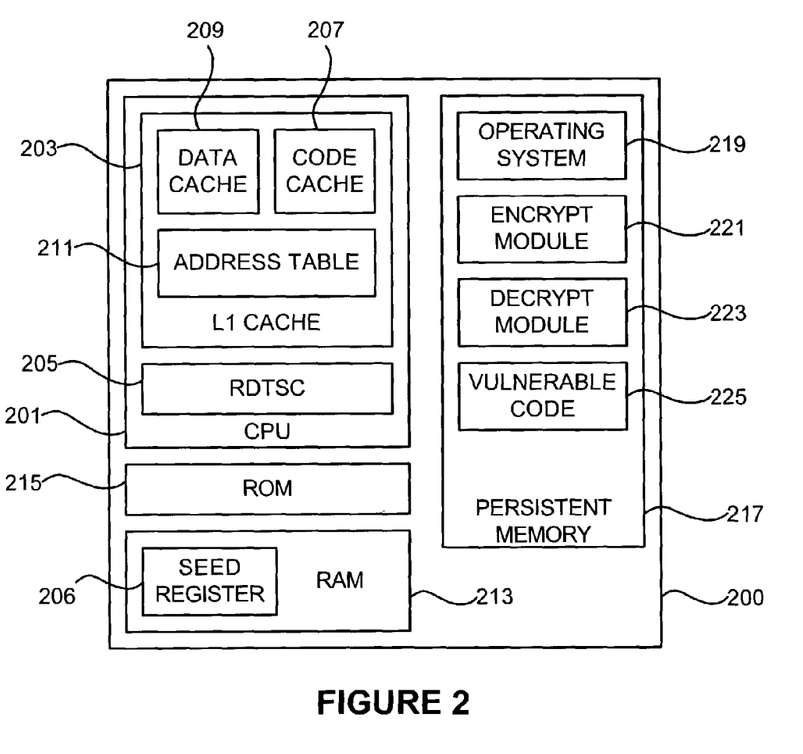
FIG. 2 illustrates a block diagram of a computer system adapted to perform one or more aspects of the invention.

With reference to FIG. 2, a computer system may be adapted to protect against stack buffer overflow attacks by modifying the operating system to encrypt and decrypt return addresses in order to detect whether a return address value has been altered and, if so, to stop execution of the attacked program.

In one embodiment of the invention, a computer system 200 may include a CPU 201, such as an Intel X86-type processor that includes an L1 Cache (primary cache) 203 and read time stamp counter (RDTSC) 205 (the RDTSC indicates the cycle number the processor is running). When the computer is turned on, RDTSC 205 generates a value from which the processor 201 counts clock cycles. This value may be stored in a seed register 206 with the task state in RAM and used as a key for encrypting data, as further described below. Either the operating system or the CPU may initialize the seed register during the task creation.

L1 cache 203 may include a code cache 207 and data cache 209. Processor 201 uses the code cache 207 to store instructions (operation codes, or opcodes) prior to execution, based on the currently executing application program, and uses data cache 209 to store data arguments for each opcode, when applicable. Processor 201 may use instruction pipelining capabilities to prefetch instructions (typically including an opcode and an operand) and store them in code cache 207. L1 cache 203 may also include an address table 211 used for storing return address information according to one or more aspects of the invention, as described below.

Computer 200 may also include RAM 213 and ROM 215. In addition, computer 200 may store in memory 217 (e.g., a hard disk or other persistent storage) an operating system module 219, an encryption module 221, a decryption module 223, and vulnerable code 225. Operating system module 219 controls the overall operation of the computer system, as is known in the art with respect to operating systems. Encryption module 221 may encrypt return addresses before sending them to the address table (and thereafter onto the runtime stack), and decryption module 223 may decrypt return addresses as they are read off the runtime stack, as further described below. Alternatively, encryption module 221 and/or decryption module 223 may be incorporated in operating system 219 so that the computer's operating system performs the encryption and decryption services. Incorporating the encryption and decryption modules into the operating system would efficiently enable debuggers to analyze core dumps. Vulnerable code 225 may be any software application or code component that is vulnerable to buffer overflow attacks as described above.

One of skill in the art will appreciate that other types of computer systems may be adapted to perform according to the invention. For example, computer system 200 may alternatively be a mobile telephone (or other mobile terminal), a personal digital assistant, an APPLE® computer using a Motorola or other type processor, a reduced instruction set computer (RISC), or any other type of computer or data processing system. The systems and methods disclosed herein may benefit systems using both fixed-size (RISC-based systems) and variable-sized (CISC-based systems) instruction sets.

Figure 3:
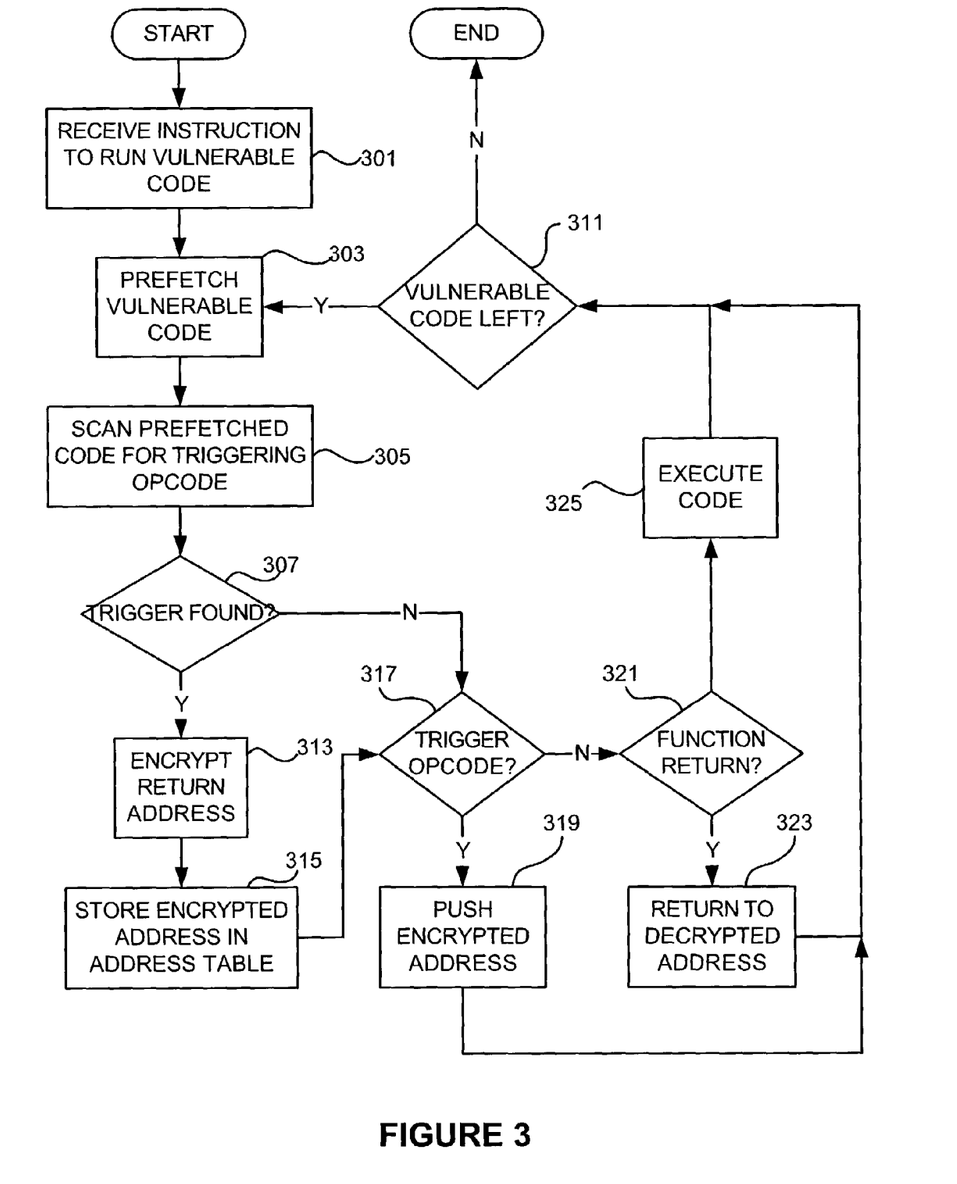
FIG. 3 illustrates a method for preventing stack buffer overflow attacks in a computer system, according to one or more aspects of the invention.

With further reference to FIG. 3, one or more aspects of the invention provide a method for preventing stack buffer overflow attacks. Initially, in step 301, either a user or an automated process (e.g., another program) instructs computer system 200 (specifically, processor 201) to run vulnerable code 225. Upon being instructed to run the vulnerable code, processor 201, in step 303, begins to prefetch the vulnerable code, stores the prefetched code in code cache 207, and stores the prefetched data in data cache 209.

In step 305, before the processor executes any opcodes stored in code cache 207, operating system 219 scans the code cache for any triggering opcodes that transfer program flow control to another function, and that use a return address to return flow control after the function has finished executing. For example, when CPU 201 is an Intel X86-based CPU, operating system 219 may scan for the "call" opcode, because the "call" opcode causes the procedure named in the operand to be executed. However, in alternative computer systems that use other types of processors, the operating system may scan for other instructions or opcodes. The scanning may be performed while CPU 201 is executing another already-scanned instruction or it can be done prior to execution of any of the vulnerable code.

In alternative embodiments, scanning may be performed at different times in the execution cycle. For example, when the processor does not use an L1 cache, the opcodes may be scanned after the binary code is loaded in RAM. The processor may scan opcodes individually, all at once, or in sets as each set is loaded into RAM or into the L1 cache. Scanning, generally, refers to the analysis of an opcode at or from any location to determine whether the opcode is a trigger opcode.

In step 307, if operating system 219 finds a triggering opcode, computer system 200 proceeds to step 313 to perform preventative measures blocking any prospective buffer overflow attack. If no triggering opcodes are found, computer system 200 jumps to steps 317–325 to execute the scanned code, as described below.

In step 313, having detected a triggering opcode, computer system 200 encrypts the return address, i.e., the address of the opcode to which the program returns after the called function has finished execution, before pushing the return address on the runtime stack. For example, given the code:

| Address | Opcode/Operand |
|---------|----------------|
| 1A3D    | move a = b     |
| 1A52    | call foo       |
| 1B13    | move c = d     |

The first line of code, stored in memory beginning at location 1A3D, performs a non-triggering opcode. The second line of code, stored in memory beginning at location 1A52, is a trigger opcode calling function foo. Upon completion of foo, the program proceeds with the next instruction, stored in memory beginning at location 1B13. Thus, the return address 1B 13 will be pushed onto the runtime stack (after encryption as described herein).

In step 315 the system stores the encrypted address in address lookup table 211 along with the corresponding unencrypted return address. Encryption module 221 may encrypt the return address using any known symmetric encryption algorithm, and may use as an encryption key the value stored in seed register 206. In an alternative embodiment, the key may be dynamic such that the same key is not used for each address encryption. For example, the operating system may poll RDTSC 205 when it starts prefetching or begins executing each piece of vulnerable code, and store the polled value from RDTSC in the seed register. Thus, the system would encrypt return addresses for each piece of vulnerable code using different encryption keys. Those of skill in the art will appreciate that other dynamic key schemes may alternatively be used.

After scanning the prefetched code and encrypting any return addresses, CPU 201 executes each scanned opcode according to steps 317–325. In step 317, the CPU determines whether the present opcode is a triggering opcode. If so, in step 319, instead of pushing the actual return address onto the runtime stack, CPU 201 pushes the encrypted value corresponding to the return address onto the runtime stack, and deletes the corresponding entry from address lookup table 211.

If the present opcode is not a trigger opcode, as determined in step 317, then in step 321 CPU 201 determines whether the current instruction is a return from a previous function call. If so, operating system 219 in step 323 decrypts the return address using the same encryption algorithm and key (i.e., the value stored in seed register 206) and, after decrypting the return address, CPU 201 returns the executing code's flow control to the decrypted return address. If the present opcode is neither a trigger opcode nor a returning function call, then the system in step 325 executes the instruction (opcode, and operand when applicable) as normal. After the system executes the scanned opcodes (whether in step 319, 323, or 325), it returns to step 311 to determine whether any of the vulnerable code remains to be prefetched, scanned and executed.

Because the return address stored in the stack is encrypted, it may be difficult to detect whether an attacker has altered the encrypted return address. That is, if an attacker has altered the encrypted return address, the system might simply pop the altered encrypted return address and attempt to decrypt it, which would result in an incorrect or nonexistent decrypted return address. Thus, in some embodiments of the invention, the system may perform error checking to determine whether an attacker has altered the encrypted return address on the stack. In one such embodiment, the system may hash a known static value (e.g., the CPU's serial number) with the seed to obtain an n-bit hash value. The system then appends the hash value to the return address prior to encryption. Subsequently, when the encrypted value is popped off the stack and decrypted, the system rehashes the seed with the known value, and compares the new hash to the last n bits of the decrypted return address. The two values only match when the encrypted return address was not altered while on the stack.

In another such embodiment, the system may perform a backward-look technique to determine whether the opcode immediately prior to the opcode to which the decrypted return address points is a trigger opcode. That is, after decrypting the return address and prior to executing the referenced opcode, the processor examines the opcode prior to the referenced opcode. If the prior opcode is not a trigger opcode, the system may assume that the encrypted return address was altered while on the stack.

Computers with multitask-capable operating systems may also benefit from the present invention by adding parsing and substitution capabilities (to handle loading and reading multiple task states from memory) to the hardware logic of CPU 201. For each task (application process), there is a task register that points to the task's process control block, known as a task state segment (TSS), storing the register states for that task.

Figure 4:
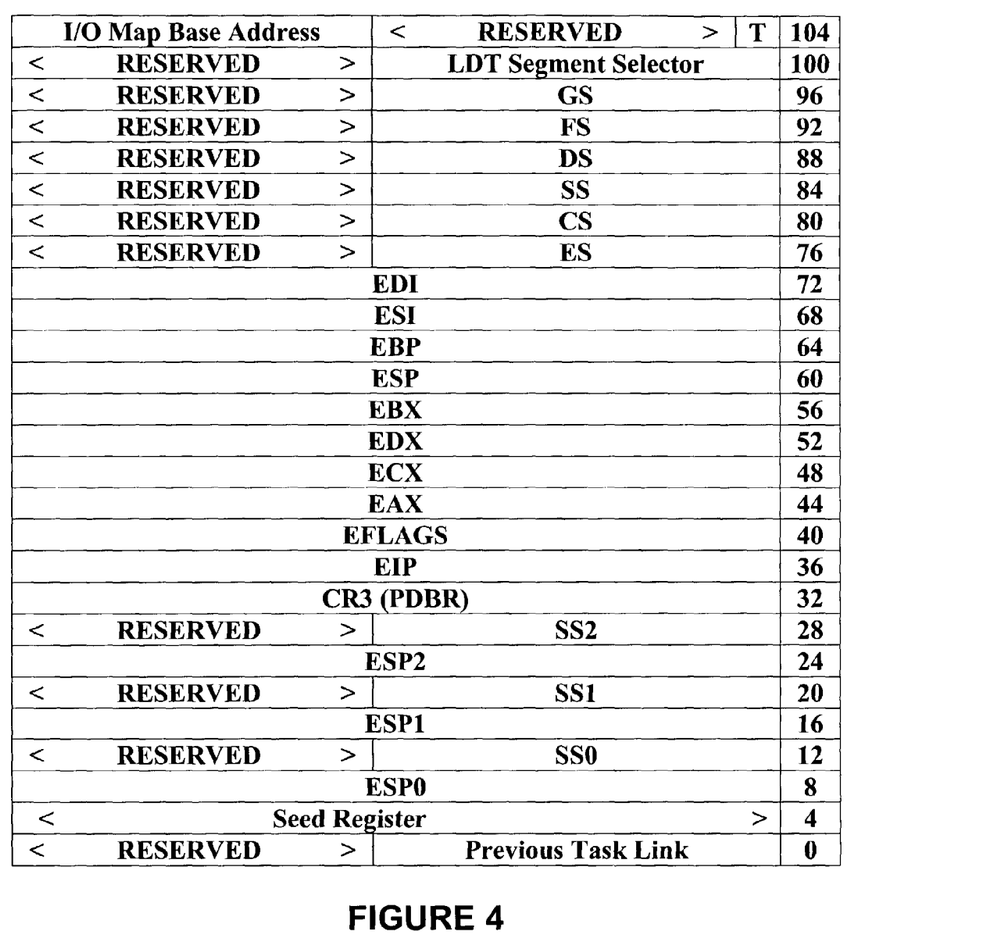
FIG. 4 illustrates a 32-bit Task State Segment (TSS) according to one or more aspects of the invention.

In order to provide increased security, each task preferably uses a different key (seed) value to encrypt and decrypt return addresses. As illustrated in FIG. 4, a seed register in the TSS storing a 32-bit value as part of the task state for each task may be used to store each task's encryption key. The seed register is then automatically loaded during each context switch, which is an atomic operation performed by CPU 201. The seed register may be generated randomly as discussed above. Alternative key generation algorithms may alternatively be used, as is known in the art.

When operating system 219 wants to schedule another application process, the processor performs a context switch. During a context switch, the new task is selected and its task state segment (TSS) is loaded as pointed to by the task register value for that task. The task state segment (TSS) includes the seed register which is automatically used as a key value for performing stack overflow prevention as described herein.

Debugging applications may also be modified to function properly with the encrypted return addresses by using information from the stack frame and seed register to decrypt return addresses off the runtime stack, and by providing the debugger access to at least the decryption module 223. The debugger may store the seed value along with the "core" file for the application being debugged, so that the debugger can analyze the stack or segment violation error that prompted the debugging session.

Figure 5:
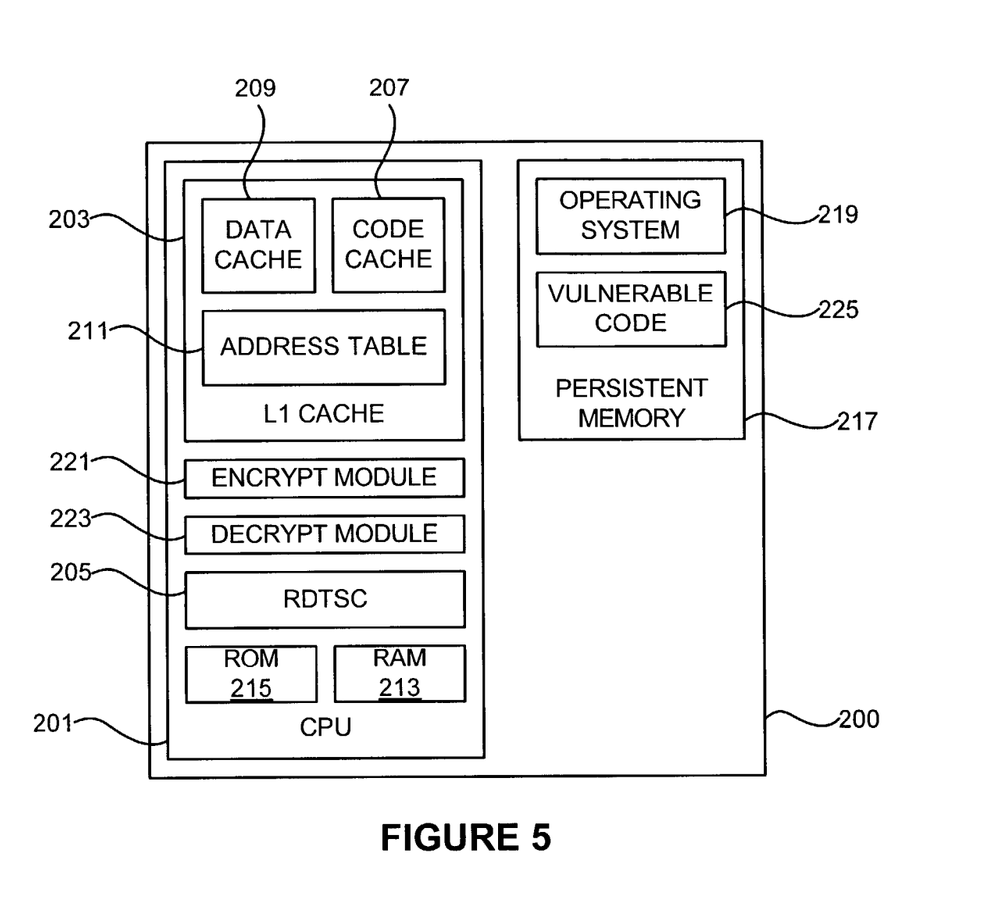
FIG. 5 illustrates a block diagram of a computer system with adapted hardware to perform one or more aspects of the invention.

The invention may be embodied in a mobile terminal. For example, in a mobile terminal using a CPU with a 256-byte prefetch queue, the encryption/decryption modules may be added between the prefetch queue and the execution engine of the CPU, as illustrated in FIG. 5. FIG. 5 illustrates a block diagram of a mobile terminal in which the mobile terminal's hardware (i.e., the CPU) has been modified to perform as taught herein. It should be appreciated by one of skill in the art that mobile terminals may alternatively use software embodiments as described with reference to FIG. 2, or a combination of hardware and software to accomplish the inventive principles.

The inventive methods may be embodied as computer readable instructions stored on a computer readable medium such as a floppy disk, CD-ROM, removable storage device, hard disk, system memory, or other data storage medium, and the computer readable instructions may be stored in one or more code modules. While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method for preventing stack buffer overflow in a computer system, comprising steps of:
   (a) prior to their execution, scanning opcodes for a trigger opcode;
   (b) for each trigger opcode found, encrypting an operand associated with the trigger opcode;
   (c) at execution of the trigger opcode, using the operand's corresponding encrypted value instead of the operand's actual value.

2. The method of claim 1, further comprising a step of, prior to execution, storing the operands and their corresponding encrypted values in a lookup table.

3. The method of claim 1, wherein the trigger opcode comprises a function call opcode, and the operand comprises a return address.

4. The method of claim 3, further comprising a step of, when the function call returns, decrypting a value off the runtime stack to determine the actual return address of the function call.

5. The method of claim 1, wherein the trigger opcode comprises an opcode that cause the computer system to place a return address on the runtime stack.

6. The method of claim 5, wherein the computer system comprises an X86-type CPU and the set of trigger opcode comprises a 'call' opcode.

7. The method of claim 1, wherein step (b) comprises encrypting the return address using a key stored in a seed register.

8. The method of claim 7, wherein the seed register is unique to a current task.

9. The method of claim 1, wherein step (b) comprises using an encryption key based on a clock value.

10. The method of claim 9, wherein the computer system comprises an X86-type CPU and step (b) comprises using an encryption key generated from a read time stamp counter (RDTSC).

11. The method of claim 1, wherein the opcodes comprise a fixed size instruction set.

12. The method of claim 1, wherein the opcodes comprise a variable-sized instruction set.

13. A computer system, comprising:
    a CPU that controls operation of the computer system based on an operating system stored in a memory, wherein the CPU scans each operation code (opcode), prior to their execution, for a trigger opcode;
    an encryption module that encrypts a trigger opcode's operand before the operand is stored in a runtime memory during execution of a program; and
    a decryption module that decrypts the trigger opcode's operand when the decrypted operand is read from the runtime memory during execution of the program.

14. The computer system of claim 13, wherein, prior to executing the trigger opcode, the CPU stores the trigger opcode's operand and its corresponding encrypted value in a lookup table.

15. The computer system of claim 13, wherein the CPU scans each opcode for any of a set of trigger opcodes comprising opcodes that cause the computer system to place a return address on the runtime stack.

16. The computer system of claim 13, wherein the computer system comprises an X86-type CPU and the trigger opcode comprises a 'call' opcode.

17. The computer system of claim 13, wherein the encryption and decryption modules use an encryption key stored in a seed register.

18. The computer system of claim 17, wherein the seed register is unique to a current task.

19. The computer system of claim 13, wherein the wherein the encryption and decryption modules use an encryption key based on a clock value.

20. The computer system of claim 19, wherein the computer system comprises an X86-type CPU that uses an encryption key is generated from a read time stamp counter (RDTSC).

21. The computer system of claim 13, wherein the trigger opcode comprises a function call opcode, the operand comprises a return address, and the runtime memory comprises a runtime stack.

22. A mobile terminal, comprising:
- a CPU that controls operation of the mobile terminal based on an operating system stored in a memory, wherein the CPU scans each operation code (opcode), prior to their execution, for a trigger opcode;
- an encryption module that encrypts a trigger opcode's operand before the operand is stored in a runtime memory during execution of a program; and
- a decryption module that decrypts the trigger opcode's operand when the decrypted operand is read from the runtime memory during execution of the program.

23. The mobile terminal of claim 22, wherein the mobile terminal comprises a mobile telephone.

24. The mobile terminal of claim 22, wherein the operating system comprises the encryption module.

25. The mobile terminal of claim 22, wherein the operating system comprises the decryption module.

26. The mobile terminal of claim 22, wherein the CPU encrypts and decrypts the return address using a key stored in a seed register.

27. The mobile terminal of claim 26, wherein the seed register is unique to a current task.

28. The mobile terminal of claim 26, wherein the CPU uses an encryption key based on a clock value.

29. A method for preventing stack buffer overflow attacks, comprising steps of:
- (a) prefetching code to be executed on a CPU;
- (b) scanning the prefetched code for instances of a 'call' operation code (opcode);
- (c) for each found instance of the 'call' opcode, encrypting a return address associated with that instance;
- (d) storing each found instance's return address and its corresponding encrypted value in a lookup table;
- (e) at execution of each instance of the 'call' opcode, looking up its associated return address in the lookup table, and pushing the looked up return address's encrypted value onto a runtime stack;
- (f) when each encrypted value is read off the runtime stack, decrypting the encrypted value to determine an execution control flow return address.

30. The method of claim 29, wherein steps (c) and (f) comprise using an encryption key unique to a current task.

* * * * *